US006550391B1

United States Patent
Ostwald et al.

(10) Patent No.: US 6,550,391 B1
(45) Date of Patent: Apr. 22, 2003

(54) METHOD AND SYSTEM FOR MOVING CARTRIDGES BETWEEN STORAGE LIBRARIES

(75) Inventors: Timothy C. Ostwald, Louisville, CO (US); Daniel James Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/354,814

(22) Filed: Jul. 16, 1999

(51) Int. Cl.[7] .................. B61J 3/00; B65G 1/00
(52) U.S. Cl. .................. 104/88.02; 414/273
(58) Field of Search .................. 104/88.01, 88.02, 104/88.03; 414/273, 277

(56) References Cited

U.S. PATENT DOCUMENTS

| | | |
|---|---|---|
| 4,504,936 A | 3/1985 | Faber et al. |
| 5,388,946 A | 2/1995 | Baur |
| 5,395,199 A | 3/1995 | Day, III et al. |
| 5,429,470 A * | 7/1995 | Nicol et al. .................. 414/331 |
| 5,479,581 A | 12/1995 | Kleinschnitz |
| 5,570,337 A | 10/1996 | Dang |
| 5,703,843 A | 12/1997 | Katsuyama et al. |
| 6,022,180 A | 2/2000 | Motoyama et al. |

* cited by examiner

Primary Examiner—S. Joseph Morano
Assistant Examiner—Robert J. McCarry, Jr.
(74) Attorney, Agent, or Firm—Brooks & Kushman P.C.

(57) ABSTRACT

A system and a method for moving cartridges between individual cartridge libraries of a multi-library system. The system includes one or more transport robots operating on one or more guide structures. The transport robots carry the cartridges independently of all individual libraries, except the sending and receiving libraries. Load ports at each library transfer the cartridges between the transport robots and the library's robotic arm. The load ports can also hold the cartridges allowing for asynchronous operations between the transport robots and sending/receiving libraries. The guide structures may be routed through one, two or all three dimensions allowing individual library placements to account for walls, columns, floors, ceilings, and other physical obstacles. One or more controllers may be included to coordinate transport robot and cartridge movement.

32 Claims, 5 Drawing Sheets

METHOD AND SYSTEM FOR MOVING CARTRIDGES BETWEEN STORAGE LIBRARIES

TECHNICAL FIELD

The present invention relates to the field of apparatus and methods for moving cartridges between automated data cartridge libraries.

BACKGROUND ART

Automated data cartridge library systems are available in many shapes and sizes. The most common library systems are configured as either a two-dimensional array of storage cells that resemble bookshelves, or a cylinder of storage cells that resemble farm silos. The cylindrical, or silo type of library is popular because the robotic arm within the silo is never more than one half the silo away from the next desired cartridge, the enclosed shape acts as a shield between the human operator and the robotic arm, and several silos can be arranged in a honeycomb pattern allowing the library system to grow incrementally.

A load/unload port is usually provided in the side of the silo for inserting new cartridges into a silo and removing existing cartridges. Large library systems often have a few, or even just one load/unload port for the entire system for economical reasons. For this, and others reasons, pass through ports are installed between adjacent silos in a multi-silo library system to allow for the transfer of cartridges between adjacent silos. Moving a cartridge starts when the robotic arm of the sending silo acquires the cartridge and places it in the pass through port. The robotic arm in the adjacent silo then moves the cartridge from one pass through port to another pass through port. This process is repeated by each robotic arm in each silo along the cartridge's route until the cartridge reaches the receiving silo. Moving the cartridge through several silos is time consuming and disrupts the operations of the silos along the route. Each silo along the cartridge's route must spend some time moving the cartridge from one pass through port to another. In practice, error recovery routines cause all of the robotic arms and pass through ports along the cartridge's route to halt all other operations until the routing is complete. A considerable portion of a library system can be brought to a halt during long cartridge moves. When many inter-silo cartridge moves are required, the overall library system performance decreases.

Pass through ports place constraints on the layout of multi-silo library systems. Silos must be placed adjacent to at least two other silos to allow the cartridges to pass through. The adjacent requirement means that all of the silos must reside in the same room. Support columns and partial walls within the room further constrain silo placement. Maintenance and other human access requirements also constrain silo layout to no more than two rows wide.

Several patents have been issued disclosing mechanisms for moving cartridges between adjacent and neighboring storage units within a library system. U.S. Pat. No. 5,388,946 issued to Baur on Feb. 14, 1995, discloses a robot that moves on rails across the face of a two-dimensional storage array. The main task of the robot is to move cartridges between the storage array and read/write drives and between different slots in the same storage array. While the robot is moving the cartridge between storage arrays and read-write drives, no other cartridges can be accessed and moved to other locations.

U.S. Pat. No. 5,703,843 issued to Katsuyam et al. on Dec. 20, 1997, discloses a rail-based robotic accessor that moves cartridges between multiple storage drum units and read/write drives. While this robotic accessor is manipulating a cartridge in one storage drum unit, no other cartridges in that drum unit can be accessed and transported to other locations.

U.S. Pat. No. 5,570,337 issued to Dang on Oct. 29, 1996, discloses a rail-based media carriage that moves cartridges between adjacent columns in a multi-column library system. This design allows a media transport apparatus associated with each column to move other cartridges between the read/write drives and storage slots of the column while the media carriage is moving a cartridge between columns. A limitation of this design is that the media transport apparatus and media carriage must meet at predetermined positions at the same time so that the media transport apparatus can insert and remove a cartridge from the media carriage. While the media carriage is waiting at one of the predetermined positions no other cartridges can be moved between columns.

U.S. Pat. No. 5,429,470 issued to Nicol et al. on Jul. 4, 1995, discloses a transport conveyer belt mechanism that moves cartridges between adjacent columns in a multi-column library system. Each column has its own belt. To the left and right of each belt, except the two end belts, are the belts of the adjacent columns. A cartridge placed on one belt is moved from belt to belt, from column to column until the cartridge reaches the receiving column. Similar to the media carriage in the Dang patent, the belt of the receiving column must hold the cartridge at a predetermined position until the gripper mechanism of the receiving column removes the cartridge from the belt. While this belt is waiting, it blocks other cartridges that must be routed through that column.

U.S. Pat. No. 5,395,199 issued to Day, III et al. on Mar. 7, 1995 discloses a robotic car-based system for use with a horizontal storage array. The storage cells for this library system create a floor across which one or more robotic cars operate. Each robotic car can move anywhere across the floor. The robotic cars move the cartridges between storage cells and the read/write drives. They may also be used to move cartridges from one horizontal storage array to another. One limitation of this design is that each storage array must be oriented horizontally, or near horizontal thus they consume a large amount of floor space. Another limitation is that the robotic cars must carry their own power source to allow free movement on the floor. This means that the robotic cars must be taken out of service occasionally for recharging. Finally, the robotic cars must carry optical sensors and processing circuitry of sufficient complexity to provide an ability to sense and follow optical patterns positioned on the floor.

What is desired is a rail-like transport system that operates external to the individual libraries to move the cartridges between the libraries. This approach makes moving cartridges long distances efficient since only the sending and receiving libraries are involved with the move. The system should include at least one port at each library to allow asynchronous operation between the robotic arms inside each library and the carriages moving between libraries along the rails. Rail-like systems also make the configuration of the overall library system more flexible since the libraries do not have to be adjacent, in the same room, or even on the same floor in the building. Finally, the use of rails or other guiding structures simplifies the propulsion and guidance requirements imposed on the carriages.

DISCLOSURE OF INVENTION

The present invention is a system and a method for moving cartridges between individual cartridge libraries of a multi-library system. The system includes one or more transport robots operating on one or more guide structures. The transport robots carry the cartridges independently of all individual libraries, except the sending and receiving libraries. This frees the libraries between the sending library and the receiving library from involvement in the cartridge moves.

Simple transport robots carry one cartridge at a time. Movement of multiple cartridges requires one transport robot to make several trips, or several transport robots to operate together. Complex transport robots may carry up to several cartridges simultaneously.

One or more load ports at each library transfer the cartridges between the transport robots and the robotic arm inside the library. The load ports can hold the cartridges to allow for asynchronous operations between the transport robots and sending/receiving libraries. Simple load port may handle only one cartridge at a time. Complex load port may handle several cartridges simultaneously.

The guide structures may be routed through one, two or all three dimensions. The flexibility of the guide structure routing allows individual library placements to account for walls, columns, floors, ceilings, and other physical obstacles. It is not necessary that individual libraries shall be adjoining. The guide structures may take on one of several forms including rails, tubes, channels and cables. Junctions such as switches, turntables, elevators and the like couple multiple guide structures.

One or more controllers coordinate transport robot and cartridge movement. One controller may be used to coordinate the entire multi-library system, or distributed controllers may be used to divide the workload. Local controllers may be mounted on each transport robot to provide greater capability or even autonomy.

Communications between the various libraries, load ports, transport robots and controllers may be accomplished through hard wires or wireless links. Wireless communications links may be in the form of radio links, optical links, acoustic links or other technologies. Wired communication links may be in the form of electrical or fiber optic cables tethered to the transport robots, or electrical signals passed through the guide structure itself.

Power for moving the transport robots may be incorporated into, or external to the transport robots. External propulsion methods include air pressure, cables and belts. Onboard propulsion methods include electric motors powered from onboard batteries, or from electrical power received through the guide structure.

Either the transport robot, the load ports, or both have grippers to exchange the cartridges between the transport robots and load ports. Load port to library exchanges may be handled solely by the library's robotic arm, or with the assistance of load port. Transfer of cartridges between transport robots may be performed directly by the transport robots, or with the aid of a transfer mechanism situated at strategic positions along the guide structures.

Accordingly, it is an object of the present invention to provide a system and a method for moving cartridges between libraries of a multi-library system where only the sending and receiving libraries are involved with the move.

Another object of the present invention is to provide for asynchronous operations between the robotic arms inside the libraries and the transport robots that move the cartridges between the libraries.

Yet another object of the present invention is to allow multi-library layouts to account for walls, columns, floors, ceilings, other physical obstacles and maintenance considerations that make it difficult to place individual libraries adjacent each other.

These and other objects, features and advantages will be readily apparent upon consideration of the following detailed description in conjunction with the accompanying drawings.

BEST MODE FOR CARRYING OUT THE INVENTION

An inter-library connectivity system uses transport robots on a rail or other similar guides structure to move cartridges from one library to another library. The present invention is independent of the type of libraries that it connects. The individual libraries may be two-dimensional arrays, twelve-sided silos, hexagonal arrays, or any other type, size or shape. The cartridge capacity and cartridge type used in the individual libraries are also immaterial to the present invention. Each library may store dozens or thousands of cartridges. In this description, "cartridge" is meant to include tape cartridges, cassettes, disks, and any other form factors that can be used in an automated library. A cartridge may house magnetic media, optical media, paper media, solid state media, and similar media.

The guide structure is routed mainly outside the individual libraries so as not to impede the libraries' normal functions. In some variations it is possible that the guide structures route into the interior of a library to receive and deliver cartridges. The guide structure may be linear, being routed in a straight line past all of the libraries in the system. The guide structure may be routed through two dimensions to account for walls, columns, rooms, and other obstacles that may lay between the libraries. Some guide structures may be routed through three dimensions to provided connectivity between libraries on different floors of a building, different levels in a room, or different types of libraries that interface to the guide structure at different heights above the floor. Some guide structures may terminate at fixed ends while other may be formed as closed loops. Transport robots traveling along the guide structure may move in one direction only, or in multiple directions.

Figure 1:
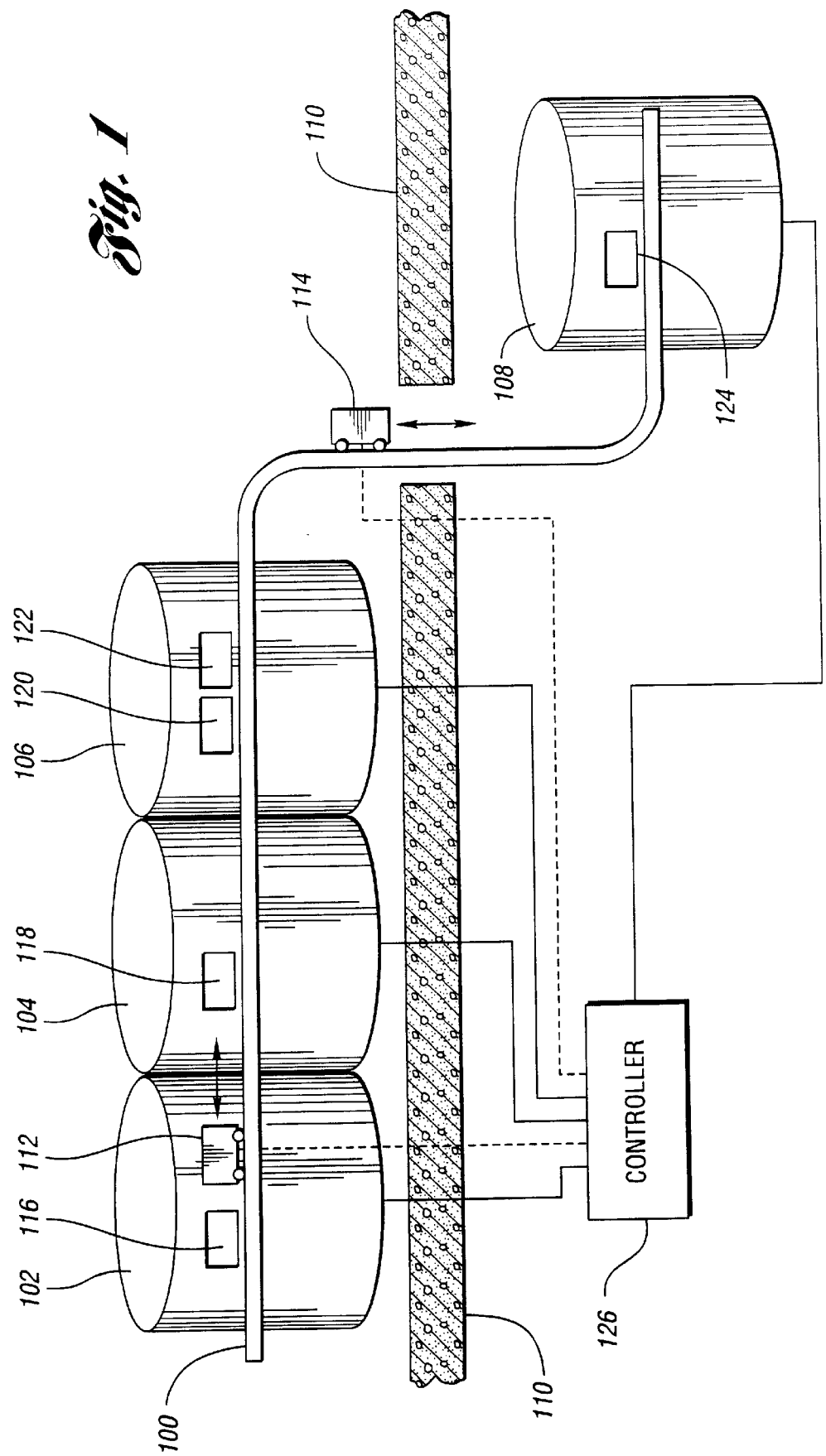
FIG. 1 is a perspective view of a multi-library system having three libraries on one floor and a fourth library on another floor.

FIG. 1 is an example of a rail guide structure 100 connecting four silo type libraries, silos 102–108. Three silos 102–106 are located above a floor 110 and the fourth silo 108 is located below the floor 110. Two transport robots 112–114 move along the rail guide structure 100 to carry cartridges (not shown) between the four silos 102–108. In this particular example, the transport robots 112–114 are designed to couple to the rail guide structure 100 so they can move vertically, as shown by transport robot 114, as well has horizontally, as shown by transport robot 112. Each silo 102–108 has a load port 116–124 that exchanges the cartridges with the transport robots 112–114. Note that having multiple load ports is possible for a silo. For example, silo 106 is shown having two load ports 120 and 122. Multiple load port may be used for redundancy, parallel transfers of cartridges, or transferring cartridges with multiple transport robots on multiple guide structures. A main controller 126, in this example, is used to coordinate the movement of the cartridges by the transport robots 112–114. Main controller 126 is in communication with each silo 102–108 through wired links, and in communication with the transport robots 112–114 through wireless links in this embodiment.

Transport robots are used to carry the cartridges between the various libraries that make up the library farm or library system. The transport robots may range from simple containers that have no moving parts and consume no power, to complex, self-powered, autonomous robots with one or more articulate grippers for gripping and manipulating the cartridges. A minimal inter-library connectivity system requires one transport robot that is capable of carrying one cartridge at a time. Complex inter-library connectivity systems may have dozens of transport robots operating simultaneously, with each transport robot carrying multiple cartridges, and convoys of transport robots moving many cartridges as a single block.

Between the transport robots and the individual libraries are the load ports. Various configurations allow the number of load ports to vary from one load port per individual library to several load ports on an individual library. Load ports are used to exchange the cartridges with the transport robots and the robotic arms inside the individual libraries. The load ports are also used to hold cartridges allowing for asynchronous operations between the transport robots and the robotic arms. Some load ports may handle only one cartridge at a time. Other load port configurations can handle several cartridges simultaneously. Load port may be simple storage cells requiring no power and having no moving parts. When such load ports are used, the transport robots must be capable of inserting and removing the cartridges from one side of the load port while the library's robotic arm inserts and removes the cartridges from the other side of the load port. More complex load port configurations may be used to account for simpler transport robot configurations. For example, the load port may include articulated gripper mechanisms that can give and receive the cartridges from the transport robots on one side. On the other side, the load port may be passive while the library's robotic arm inserts and removes cartridges from the load port. In other configurations, the load port may be actively involved in transferring the cartridges with both the transport robots and the library's robotic arm, including manipulating the cartridge's orientation. The load ports may access the robotic arm through the walls, ceiling, or even floor of the library. It is also possible for the load port to reside on the inside of the library thus requiring the guide structure to pass through the ceiling, walls, or floor of the library.

Figure 2:
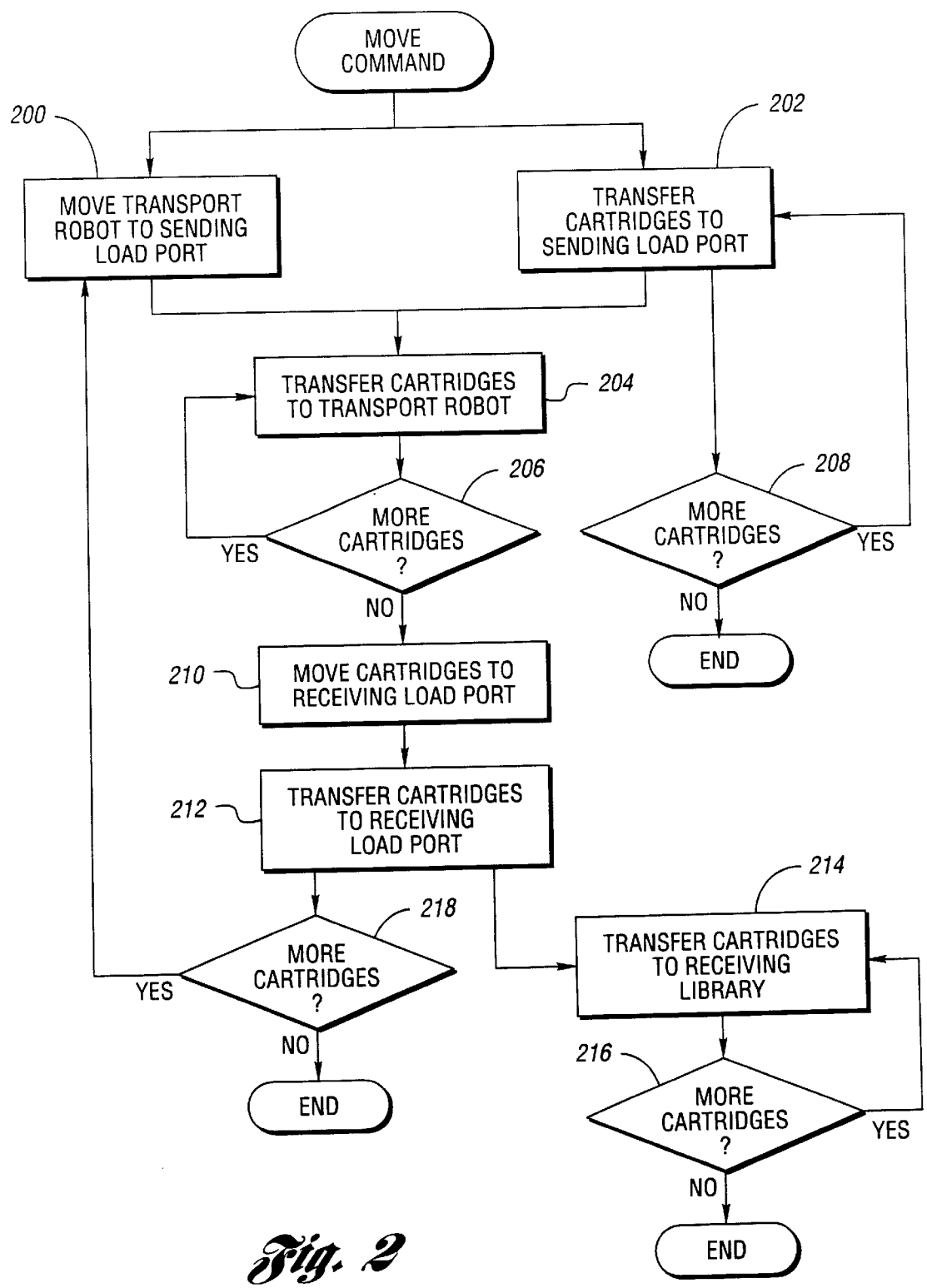
FIG. 2 is a flow diagram of a process for moving one or more cartridges between libraries.

FIG. 2 is a flow diagram of a process for moving multiple cartridges between two libraries. The process starts upon the receipt of a move command that identifies the cartridges to be moved, a sending library currently holding the cartridges, and a receiving library. A transport robot is identified to service the command and that transport robot is moved to the load port of the sending library, as shown in block 200. While the transport robot is in route to the sending library, the robotic arm of the sending library starts transferring the cartridges to the sending load port, as shown in block 202.

Once the transport robot has arrived at the sending load port, the cartridges are transferred from the sending load port into the transport robot, block 204. The cartridge transfer continues as long as the transport robot has a capacity to carry more cartridges and there are more cartridges to carry, as shown in decision block 206. As cartridges are moved out of the load port, the library's robotic arm continues to fill the load port with the cartridges designated as part of the move, as shown by decision block 208.

When the transport robot is full, or when the last cartridge is transferred to the transport robot, the cartridges are moved to the receiving load port at the receiving library, as shown in block 210. Next, in block 212 the cartridges are transferred from the transport robot to the receiving load port. From the receiving load port, the robotic arm of the receiving library acquires the cartridges and transfers them to the appropriate location within the receiving library, as shown by block 214. The receiving library's robotic arm continues to transfer cartridges into the receiving library until all of the cartridges have been transferred, as shown by decision block 216. If the transport robot did not have the capacity to carry all of the cartridges in one move, then decision block 218 returns the process to block 300 where the transport robot returns to the sending load port to pick up more cartridges. The process is repeated until all of the cartridges designated to be moved are in the receiving library.

Other move processes are possible within the scope of the present invention. For example, the move process may involve one cartridge carried by one transport robot in one trip. Several cartridges may be carried by one transport robot making several trips. Several transport robots may be used to move several cartridges together as part of a convoy. In another example, the transport robot may move along a predefined route receiving and depositing cartridges from various load ports along the route, similar to a city bus receiving and discharging passengers along a bus route. Here, there is no need for a controller to communicate with the transport robot or coordinate cartridge movements. The transport robot will stop at each load port along a pre-defined route. Cartridge movement is coordinated among the libraries themselves. A library having a cartridge to send places the cartridge on the transport robot when it stops at its load port. The sending library then informs the receiving library that the cartridge is on the way. When the transport robot stops at the load port of the receiving library, the receiving library removes the cartridge.

Figure 3:
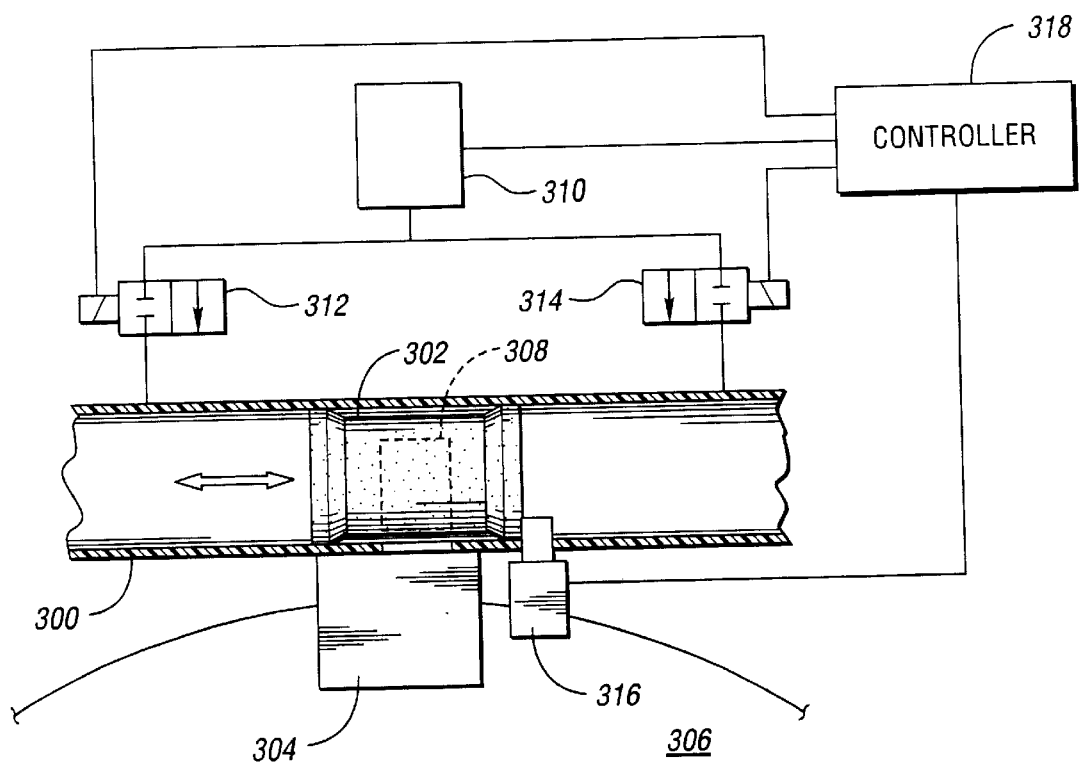
FIG. 3 is a partial transparent view of a tube guide structure.

While the rail-based guide structure is the preferred embodiment, many variations on the guide structure may be employed. The following are several examples of possible guide structures and are not meant to be a limiting set. FIG. 3 is a partial transparent view of a tube guide structure 300. A transport robot 302 is positioned at a load port 304 mounted in the wall of a library 306. The transport robot 302 carries one cartridge 308 (shown in phantom). To move the transport robot 302 along the tube guide structure 300, a pump 310 and a series of valves 312–314 create an air pressure differential across the transport robot 302.

A solenoid 316 is used to align the transport robot 302 with the load port 304. The solenoid has a blocking mode where it protrudes into the tube guide structure to act as a mechanical stop for the transport robot 302. With the solenoid in a passing mode, the tube guide structure 300 is unobstructed and the transport robot 302 may move to the right of load port 304. The solenoid is placed at a fixed position with respect to the load port 304 to achieve the alignment In the embodiment shown in FIG. 3, only one solenoid 316 is shown to the right of the load port 304. To align with the load port 304, the transport robot 302 must approach the load port 304 moving left to right. Another solenoid (not shown) is required on the left side of the load port 304 to allow alignment when the transport robot 302 is moving right to left.

Pump 310, valves 312–314, and solenoid 316 are wired to a controller 318 for control purposes.

Figure 4:
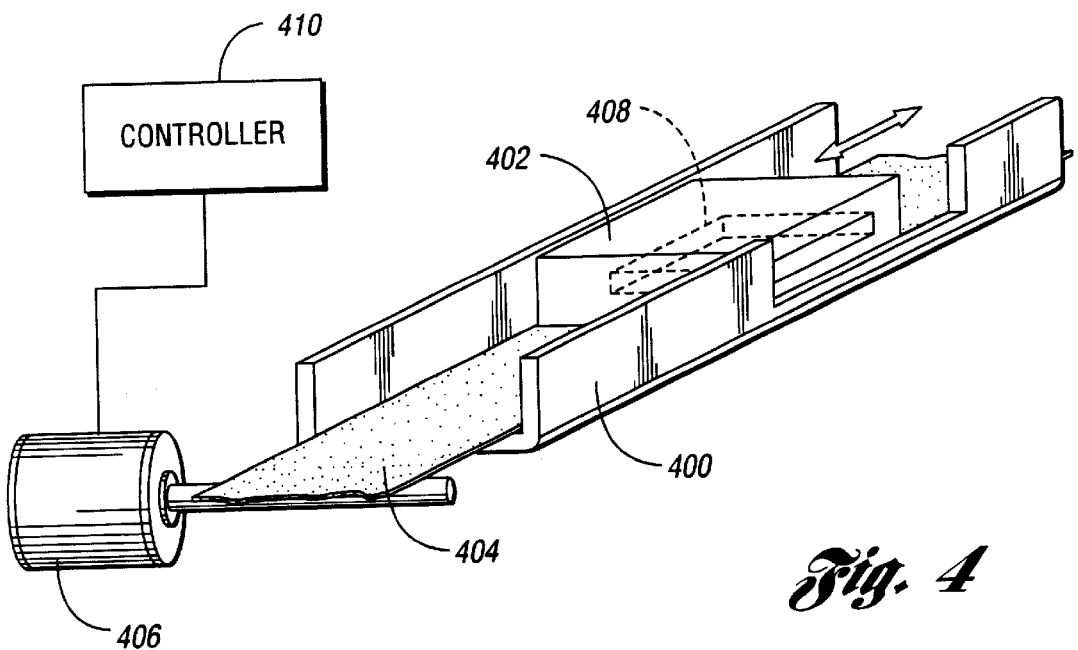
FIG. 4 is a partial perspective view of a channel guide structure.

FIG. 4 is a partial perspective view of a channel guide structure 400. In this embodiment the transport robot 402 resides inside the channel guide structure 400 on a belt 404. Motor 406 moves the belt 404 that moves the transport robot 402. A cartridge 408 is shown in phantom inside the transport robot 402. Controller 410 controls the positioning of the transport robot 402 by controlling the speed and direction of motor 406.

Figure 5:
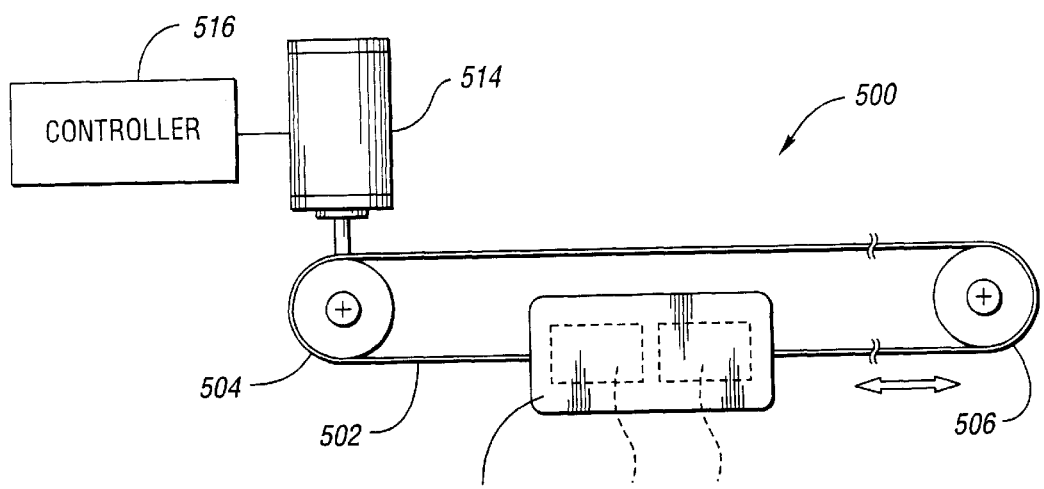
FIG. 5 is a partial side view of a cable guide structure.

FIG. 5 is a side view of a cable guide structure 500. The cable guide structure 500 comprises a cable 502 and at least two pulleys 504 and 506. A transport robot 508 is connected to, and supported by cable 502. In this embodiment, the transport robot 508 carries two cartridges 510 and 512. Movement of the transport robot 508 is provided by a motor 514 coupled to pulley 504. Controller 516 controls the speed and direction of motor 514.

Figure 6:
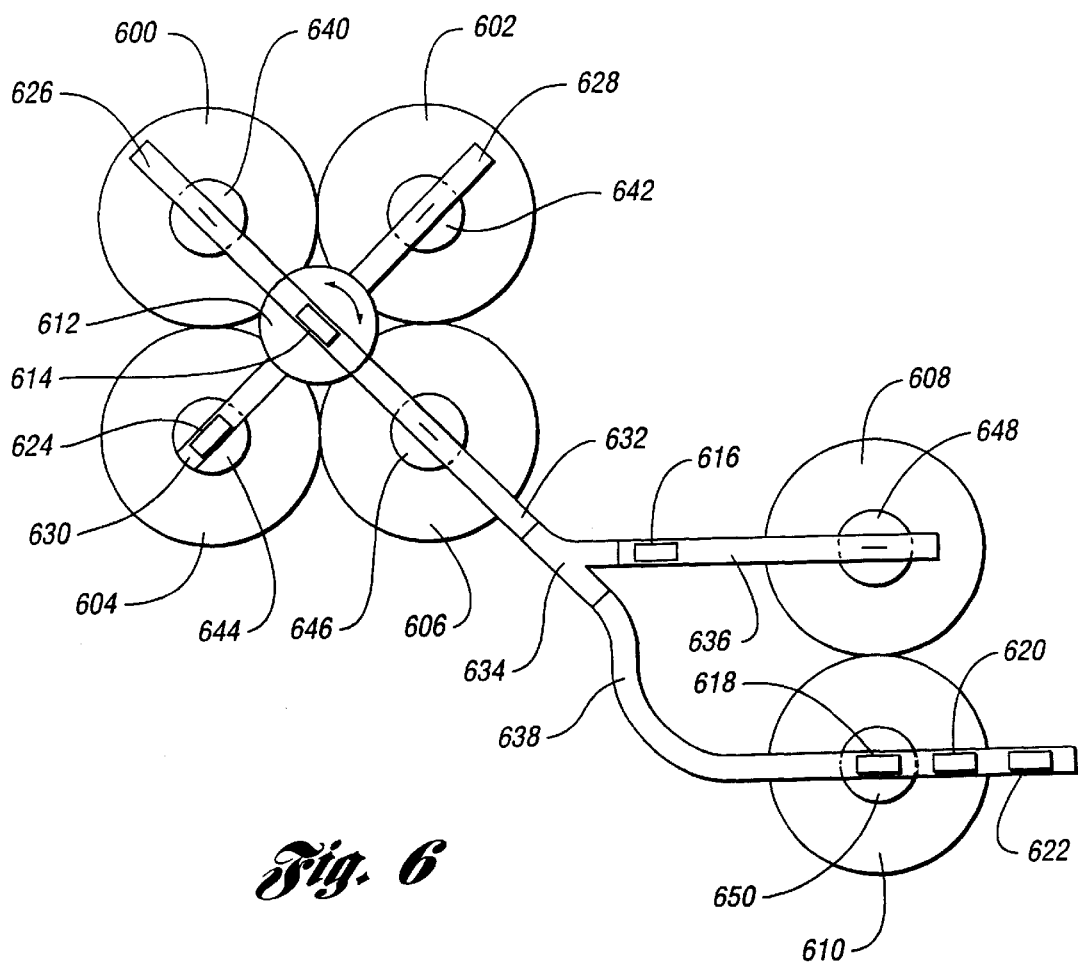
FIG. 6 is a top-down view of a multi-library system showing a switch and a turntable for directing the transport robots.

Several guide structures may be connected by various type of junctions to allow for complicated routing paths. Two junction types are shown in the top view in FIG. 6. The embodiment shown in FIG. 6 is a rail-based structure that connects six libraries 600–610. A turntable junction 612 resides at the center of the group of four silos 600–606. The turntable junction 612 directs the transport robots 614–624 between four guide structures 626–632. In FIG. 6 the turntable junction 612 is shown routing transport robot 612 between guide structures 626 and 632. A switch junction 634 connects guide structure 632 with guide structures 636 and 638.

FIG. 6 shows other aspect of the load port placement. Since FIG. 6 is a top view, load ports 640–650 are disposed on the ceilings of libraries 600–610 respectively. Had FIG. 6 been a bottom view, the load ports 640–650 would be placed on the floors of libraries 600–610 respectively.

Another aspect of the guide structures is shown by a segment of guide structure 638 that extends to the right of load port 650. This segment allows transport robots 620 and 622 to move to the right to allow transport robot 618 to reach the load port 650. Guide structure 630, on the other hand, ends at load port 644. While transport robot 624 is on guide structure 630, no other transport robot can reach load port 644.

Figure 7:
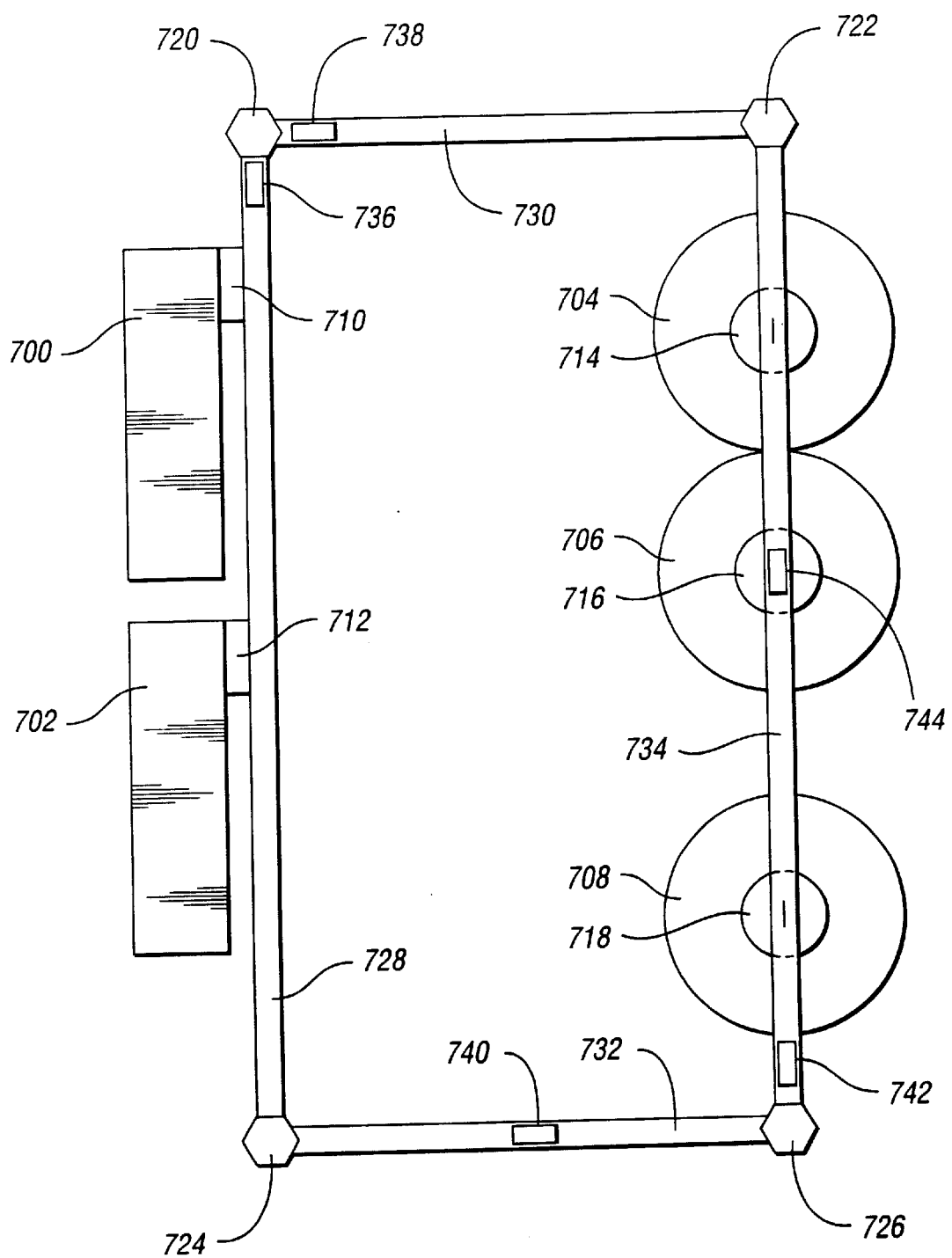
FIG. 7 is a top-down view of a multi-library system showing transfer type junctions that transfer cartridges between transport robots.

FIG. 7 is a top view of a library system having two different types of libraries. Libraries 700 and 702 are two-dimensional array types of libraries and libraries 704–708 are silo type libraries. Libraries 700 and 702 have side mounted load ports 710 and 712 respectively. Libraries 704–708 have ceiling mounted load ports 716–718 respectively. One transport robot 736–740 operates along each guide structure 728–732 respectively. Two transport robots 742 and 744 operate along guide structure 734. Many other variations are possible.

Four transfer junctions 720–726 connect guide structures 728–734. Each transfer junction 720–726 can transfer cartridges from a transport robot operating on one guide structure to another transport robot operating on another guide structure. For example, transfer junction 720 may transfer a cartridge (not shown) from transport robot 736 to transport robot 738. Transport robot 738 may move the cartridge to transfer junction 722 for transfer to transport robot 744.

Transfer type junctions allow cartridges to be passed from one transport robot to another transport robot. From the transport robot's point of view, the transfer type junction may look like another load port allowing the transport robots to maintain a simple design. More complex transport robots may be used within the scope of the present invention where one transport robot can pass cartridges to another transport robot on the same, or on a parallel guide structure.

Coordination of cartridge moves can be accomplished by multiple control configurations. The preferred approach has one main controller (e.g., controller 126 in FIG. 1) in communication with all of the libraries and transport robots. This main controller receives all cartridge move commands and then coordinates the movement of the transport robots to accomplish the moves. To avoid a single point failure from preventing all inter-library movements, redundant controllers, peer controllers, master/slave controllers and other configurations of controllers well known in the art may be used. In a very large library system, the workload of coordinating the movements of dozens of transport robots may be distributed among several controllers, each controller being responsible for a subset of libraries and associated transport robots. In yet other control configurations, each transport robot may operate autonomously with an onboard controller.

Communications between the transport robots and external controllers, and between the transport robots and libraries, where required, can be accomplished in many different wired and wireless methods. Wireless communications links are well known in the art and may include radio frequency, infrared optical, and ultrasonic acoustic transmitters and receivers. The best choice for implementation is in part dependent on the physical layout of the guide structure and control configuration. Communications links between transport robots and an external controller may use optical links where a direct line-of-sight can be maintained between the transport robots and the controller's transmitters and receivers. Multiple transceivers and acoustic communication links may be incorporated where the guide structure, libraries, walls, columns and other physical objects create communication "blind spots". Radio frequency communication links provided wide band operations, allow for multiple antennas, and have limited immunity to thin walls and other physical obstructions.

Communications with the transport robots may be achieved with wired communication links where supported by the guide structure. Where the guide structure is simple, such as short straight channel, electrical wires or fiber optical cables may be used to link the transport robot with an external controller. Another approach uses the guide structure itself as the communication link media. For example, communications may be implemented as electrical signals imposed on two electrically isolated rails of a multi-rail guide structure. Other methods may be used within the scope of the present invention.

Several forms of propulsion may be implemented to move the transport robots from load port to load port. Propulsion for simple transport robots may be provided from external to the transport robot. As discussed earlier, cables, air pressure, and belts can be used to exert forces on the transport robots to cause movement. Other propulsion methods such as planar linear motors, tubular linear motors and the like may be employed. Such propulsion methods allow of light weight, very reliable, and fast transport robots. The complexities associated with coordinating cartridge movements and transferring cartridges between transport robots and load ports are handled external to the transport robots where size, weight, or power are not critical factors.

Propulsion for the transport robots may be provided by onboard motors, usually an electrical motor. Self-propelled transport robots allow for more complicated guide structure configurations that do not have to account for straight lines of movement as are required by external cables and belt propulsion methods. Power to operate the onboard motors may be carried directly by the transport robot, or supplied from an external source. For example, in an onboard electric motor case, electrical power may be supplied by a battery carried on the transport robot, or through two or more electrically isolated rails in a multiple rail guide structure. The preferred approach supplies electrical power to the transport robots through the rails of a rail-based guide structure. An external electrical power source allows the transport robots to operate indefinitely without recharging and powers onboard electrical circuits, sensor, actuators and gripper mechanisms found on complex transport robots.

Transport robot movement usually includes a means to align with the load ports in order to exchange cartridges. The accuracy of the transport robot to load port alignment will vary with the ability of the transport robots and/or load ports to account for any misalignment. Alignment methods range from permanent mechanical stops, to contact sensors, to remote sensors and their associated alignment targets. Each mechanical stop may be a permanent barrier attached to the guide structure at a fixed position with respect to associated load ports. The fixed position is selected so that the transport robot and load port are aligned when the transport robot is in contact with the barrier. The barrier may be attached to a solenoid or other actuator to create two modes of operation. In a blocking mode, the barrier is positioned in the path of the transport robot. When the transport robot contacts the barrier, the transport robot's movement is stopped with the transport robot aligned with the load port. In a passing mode the barrier is removed from the path of the transport robot allowing continued movement along the guide structure to other load ports.

Contact sensors use physical contact between the transport robots and either the guide structure or the load port itself to sense alignment. A commonly used contact sensor is an electro-mechanical switch making contact with a detent or boss target. The switch may be mounted on the transport robot with the detent/boss target mounted on either the guide structure or the load port itself. The mounting of the switch and targets may be reversed with the targets being mounted on the transport robots. Other forms of contact sensing well known in the art may be used within the scope of the present invention. For example, the sensors may be electrical wipers and the targets are electrical pads. When the two meet, a circuit is created to signal alignment.

Remote sensors do not require physical contact between the sensor and target. Remote sensors include single cell and multi-cell optical sensors, hall effect and other magnetic sensors, acoustic sensors, inductive sensors, capacitive sensors, heat sensors, and the like. The sensors may be mounted on the transport robots and coupled to the onboard circuitry. The transport robot circuits may consume the sensor information for its own use, and/or pass the information along to an external controller. Sensors may also be mounted on either the load ports or guide structures and couple directly to external controllers.

Alignment of the transport robots and load ports may be achieved by sensors within the propulsion system for the transport robots. Tachometers, accelerometers, and position sensors coupled to the propulsion system may be used to calculate the position of the transport robot on the guide structure. The calculated position may be a relative position offset from the current position, or an absolute position with respect to a coordinate system established for the guide structure. A controller knowing the position of the load ports can direct movement of the transport robots to achieve alignment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A library system for storing cartridges, the system comprising:

a first housing an interior and an exterior, wherein the first housing houses a first storage library with the first storage library being placed within the interior of the first housing, the first housing having a first load port which provides access to the first storage library from the exterior of the first housing;

a second housing having an interior and an exterior, wherein the second housing houses a second storage library with the second storage library being placed within the interior of the second housing, the second housing having a second load port which provides access to the second storage library from the exterior of the second housing;

wherein the first housing is located outside of the exterior of the second housing, and the second housing is located outside of the exterior of the first housing;

a first guide structure routed between the first and second load ports; and at least one transport robot operable to move along the first guide structure while carrying at least one cartridge in order to transfer the at least one cartridge through the first and second load ports between the first and second storage libraries.

2. The system of claim 1 further comprising:

a third housing having an interior and an exterior, wherein the third housing houses a third storage library with the third storage library being placed within the interior of the third housing, the third housing having a third load port which provides access to the third storage library from the exterior of the third housing;

a second guide structure routed between the second and third load ports;

wherein the third housing is located outside of the exteriors of the first and second housings, and the first and second housings are located outside of the exterior of the third housing;

wherein the at least one transport robot is operable to move along the second guide structure while carrying at least one cartridge in order to transfer the at least one cartridge through the second and third load ports between the second and third storage libraries.

3. The system of claim 2 further comprising:

a third guide structure routed between the first and third load ports;

wherein the at least one transport robot is operable to move along the third guide structure while carrying at least one cartridge in order to transfer the at least one cartridge through the first and third load ports between the first and third storage libraries.

4. The system of claim 1 further comprising at least one controller in communication with the first and second libraries and the at least one transport robot, the at least one controller being operative to coordinate movement of the at least one transport robot to transfer the at least one cartridge between the first and second libraries.

5. The system of claim 4 wherein the at least one controller is one main controller.

6. The system of claim 4 wherein the at least one controller is a local controller disposed on each respective transport robot of the at least one transport robot.

7. The system of claim 4 further comprising a wireless communications link between the at least one controller and the at least one transport robot.

8. The system of claim 7 wherein the wireless communications link is selected from a group of wireless communication links consisting of a radio link, an optical link, and an acoustic link.

9. The system of claim 4 wherein the communication between the at least one controller and the at least one transport robot is accomplished through at least one cable selected from a group of cables consisting of an electrical cable and a fiber optic cable.

10. The system of claim 4 wherein the at least one controller and the at least one transport robot communicate with each other using the first guide structure as a communications medium.

11. The system of claim 4 further comprising a plurality of sensors, each sensor of the plurality of sensors disposed at a fixed position with respect to each load port respectively and in communication with the at least one controller for aligning the at least one transport robot with respect to the load ports.

12. The system of claim 4 further comprising at least one sensor disposed on each transport robot of the at least one transport robot, the at least one sensor being in communication with the at least one controller for aligning the respective transport robot with respect to the load ports.

13. The system of claim 4 further comprising:
a propulsion mechanism in communication with the at least one controller and coupled to the at least one transport robot for moving the at least one transport robot along the first guide structure; and
at least one sensor coupled to the propulsion mechanism and in communication with the at least one controller for aligning the at least one transport robot with respect to the load ports.

14. The system of claim 1 wherein the first guide structure is a plurality of guide structures, the system further comprising at least one junction connecting at least two guide structures of the plurality of guide structures and operative to route the at least one transport robot between the at least two guide structures.

15. The system of claim 14 wherein the at least one junction is selected from a group of junctions consisting of a turntable, a switch and an elevator.

16. The system of claim 1 wherein the first guide structure is at least one rail.

17. The system of claim 16 wherein the at least one rail is a plurality of rails, the system further comprising at least one power supply applying electrical power to the plurality of rails, and wherein the at least one transport robot is operative to draw electrical power from the plurality of rails.

18. The system of claim 1 wherein the first guide structure is at least one tube.

19. The system of claim 18 further comprising:
at least one pump;
a plurality of valves connecting the at least one pump to the at least one tube; and
a valve controller in communication with the plurality of valves, the valve controller being operative to control the plurality of valves to control movement of the at least one transport robot within the at least one tube.

20. The system of claim 1 wherein the first guide structure is at least one cable.

21. The system of claim 20 wherein the at least one transport robot is coupled to the at least one cable, the system further comprising:
a plurality of pulleys routing the at least one cable;
at least one motor rotatably coupled to at least one pulley of the plurality of pulleys; and
at least one motor controller in communication with the at least one motor, the at least one motor controller being operative to control the at least one motor to control movement of the at least one transport robot.

22. The system of claim 1 wherein the first guide structure is at least one channel.

23. The system of claim 22 further comprising:
at least one belt disposed in each channel of the at least one channel;
at least one motor coupled to the at least one belt to cause the at least one belt to move; and
at least one motor controller in communication with the at least one motor, the at least one motor controller being operative to control the at least one motor to control movement of the at least one transport robot.

24. The system of claim 1 further comprising a battery disposed on each transport robot of the at least one transport robot to supply electrical power to the at least one transport robot.

25. The system of claim 1 wherein the first guide structure is a plurality of guide structures and the at least one transport robot is a plurality of transport robots, the system further comprising at least one cartridge transfer mechanism disposed between at least two guide structures of the plurality of guide structures and operative to transfer the at least one cartridge between two transport robots of the plurality of transport robots on different guide structures.

26. The system of claim 1 further comprising at least one gripper disposed on each transport robot of the at least one transport robot, each gripper of the at least one gripper is operative to exchange one cartridge with the load ports.

27. The system of claim 1 further comprising a plurality of grippers, at least one gripper of the plurality of grippers being disposed in each load port, each gripper of the plurality of grippers is operative to exchange one cartridge with the at least one transport robot.

28. The system of claim 1 further comprising a plurality of mechanical stops disposed along the first guide structure at a fixed position with respect to the load ports, each mechanical stop of the plurality of mechanical stops having a passing mode and a stopping mode and is operative to align the at least one transport robot with a respective load port of the load ports when in the stopping mode, and allow the at least one transport robot to pass when in the passing mode.

29. The system of claim 1 wherein the at least one transport robot is a plurality of transport robots and wherein positioning between the first guide structure and the load ports allows a first transport robot of the plurality of transport robots to depart from a select load port of the load ports by moving in a first direction while a second transport robot of the plurality of transport robots approaches the select load port by moving in the first direction.

30. In a library system having first and second storage libraries housing within the interiors of respective first and second housings, the first and second housings having respective first and second ports which provide access to the respective first and second storage libraries from the exterior of the respective first and second housings, the first housing being located outside of the exterior of the second housing and the second housing being located outside of the exterior of the first housing, the library system further including a first guide structure routed between the first and second ports, a method for moving cartridges between the first and second storage libraries, the method comprising:

receiving a command to move a cartridge from the first storage library to the second storage library;

moving a transport robot along the first guide structure to the first port in response to receiving the command;

transferring the cartridge from the first storage library to the first port in response to receiving the command;

transferring the cartridge from the first port to the transport robot;

moving the transport robot along the first guide structure to the second port while the transport robot is carrying the cartridge;

transferring the cartridge from the transport robot to the second port; and transferring the cartridge from the second port of the second storage library.

31. The method of claim 30 wherein the library system further includes a third storage library housed within the interior of a third housing, the third housing having a third port which provides access to the third storage library from the exterior of the third housing, the third housing being located outside of the exteriors of the first and second housings and the first and second housings being located outside of the exterior of the third housing, the library system further including a second guide structure routed between the second and third ports, the method further comprising:

receiving a command to move a cartridge from the second storage library to the third storage library;

moving a transport robot along the second guide structure to the second port in response to receiving the command;

transferring the cartridge from the second storage library to the second port in response to receiving the command;

transferring the cartridge from the second port to the transport robot;

moving the transport robot along the second guide structure to the third port while the transport robot is carrying the cartridge;

transferring the cartridge from the transport robot to the third port; and transferring the cartridge from the third port to the third storage library.

32. The method of claim 31 wherein the library system further includes a third guide structure routed between the first and third load ports, the method further comprising:

receiving a command to move a cartridge from the first storage library to the third storage library;

moving a transport robot along the third guide structure to the first port in response to receiving the command;

transferring the cartridge from the first storage library to the first port in response to receiving the command;

transferring the cartridge from the first port to the transport robot;

moving the transport robot along the third guide structure to the third port while the transport robot is carrying the cartridge;

transferring the cartridge from the transport robot to the third port; and transferring the cartridge from the third port to the third storage library.

* * * * *